(12) United States Patent
Zhang et al.

(10) Patent No.: US 9,988,905 B2
(45) Date of Patent: Jun. 5, 2018

(54) SOLID-FILLING COAL MINING FEEDING AND CONVEYING MONITORING SYSTEM

(71) Applicant: CHINA UNIVERSITY OF MINING AND TECHNOLOGY, Xuzhou, Jiangsu (CN)

(72) Inventors: Jixiong Zhang, Jiangsu (CN); Nan Zhou, Jiangsu (CN); Wei Yin, Jiangsu (CN); Meng Li, Jiangsu (CN)

(73) Assignee: CHINA UNIVERSITY OF MINING AND TECHNOLOGY, Xuzhou, Jiangsu (CN)

( * ) Notice: Subject to any disclaimer, the term of this patent is extended or adjusted under 35 U.S.C. 154(b) by 223 days.

(21) Appl. No.: 15/101,877

(22) PCT Filed: Jun. 12, 2015

(86) PCT No.: PCT/CN2015/081321
§ 371 (c)(1),
(2) Date: Jun. 3, 2016

(87) PCT Pub. No.: WO2015/196933
PCT Pub. Date: Dec. 30, 2015

(65) Prior Publication Data
US 2016/0311625 A1    Oct. 27, 2016

(30) Foreign Application Priority Data
Jun. 25, 2014  (CN) .......................... 2014 1 0290169

(51) Int. Cl.
*E21F 17/18* (2006.01)
*B65G 43/08* (2006.01)
(Continued)

(52) U.S. Cl.
CPC .............. *E21F 17/18* (2013.01); *B65G 43/00* (2013.01); *B65G 43/02* (2013.01); *B65G 43/08* (2013.01);
(Continued)

(58) Field of Classification Search
CPC ........ B65G 43/00; B65G 43/02; B65G 43/08; B65G 43/10; B65G 2201/045;
(Continued)

(56) References Cited

U.S. PATENT DOCUMENTS 8,047,355 B2 * 11/2011 Ricciardi, Sr. ......... B65G 39/16
198/806
8,657,105 B2 * 2/2014 Twigger ................. B65G 43/06
198/502.1
(Continued)

FOREIGN PATENT DOCUMENTS

CN    201554495 U    8/2010
CN    202346373 U    7/2012
(Continued)

OTHER PUBLICATIONS

PCT International Search Report, PCT/CN2015/081321 dated Aug. 26, 2015 with English translation.
(Continued)

*Primary Examiner* — Leslie A Nicholson, III
*Assistant Examiner* — Keith R Campbell
(74) *Attorney, Agent, or Firm* — TraskBritt, P.C.

(57) ABSTRACT

A solid-filling coal mining feeding and conveying monitoring system, suitable for monitoring of a vertical feeding and conveying system in underground mine solid-filling mining. The monitoring system mainly consists of an industrial control computer, a PLC control box, an operating platform, a liquid crystal display, a color four-picture divider, two video optical receivers and loudspeakers, four cameras,
(Continued)

uphole electronic belt scales, downhole electronic belt scales, a radar level meter, a coal level sensor, a vibration sensor, and various matching junction boxes and cables, the components being installed in positions such as a material field, a control room, upper and lower openings of a storage silo, and a gangue transportation lane. The system implements four main functions of a solid-filling material transportation and feeding process, the four main functions being status monitoring, a full silo alarm, centralized control, and recording and querying. The monitoring content of the system is comprehensive; operation of the system is simple; and the system is safe and reliable.

3 Claims, 1 Drawing Sheet

(51) Int. Cl.
*B65G 43/00* (2006.01)
*E21F 15/06* (2006.01)
*B65G 43/02* (2006.01)
*E21F 13/04* (2006.01)
*H04N 7/18* (2006.01)

(52) U.S. Cl.
CPC .............. *E21F 13/04* (2013.01); *E21F 15/06* (2013.01); *H04N 7/181* (2013.01); *B65G 2201/045* (2013.01); *B65G 2203/0258* (2013.01); *B65G 2203/041* (2013.01)

(58) Field of Classification Search
CPC ....... B65G 2203/0258; B65G 2203/041; E21F 13/04; E21F 15/06; E21F 15/041
USPC .................................................. 198/502.1
See application file for complete search history.

(56) References Cited

U.S. PATENT DOCUMENTS

| | | | |
|---|---|---|---|
| 8,882,204 B2* | 11/2014 | Aulisio | E21C 37/16 299/14 |
| 9,441,474 B2* | 9/2016 | Yale | C09K 8/504 |
| 2011/0024369 A1* | 2/2011 | Reekers | B01D 24/30 210/786 |
| 2011/0137587 A1* | 6/2011 | Rothlisberger | B65G 43/00 702/56 |
| 2013/0146427 A1* | 6/2013 | Greirson | B65G 15/00 198/837 |
| 2013/0199240 A1* | 8/2013 | Lindig | C03B 3/023 65/29.16 |
| 2015/0108840 A1* | 4/2015 | Lane | G05B 9/02 307/31 |

FOREIGN PATENT DOCUMENTS

| | | | |
|---|---|---|---|
| CN | 102889097 A | | 1/2013 |
| CN | 203594473 U | * | 5/2014 |
| CN | 203594473 U | | 5/2014 |
| CN | 104065927 A | | 9/2014 |
| DE | 3211909 A1 | | 10/1983 |
| WO | 2015196933 A1 | | 12/2015 |

OTHER PUBLICATIONS

PCT International Written Opinion, PCT/CN2015/081321 dated Aug. 26, 2015.

* cited by examiner

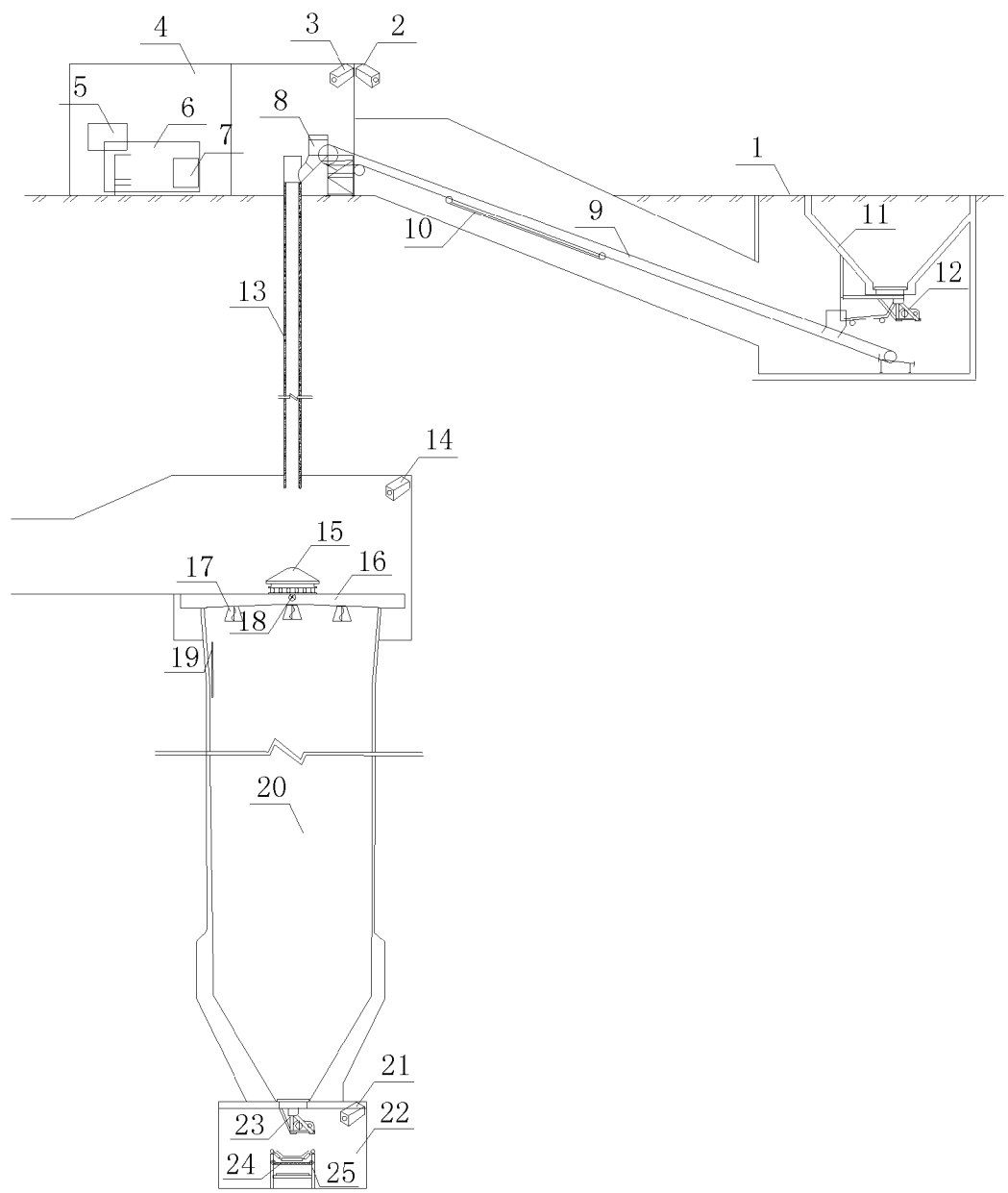

SOLID-FILLING COAL MINING FEEDING AND CONVEYING MONITORING SYSTEM

CROSS-REFERENCE TO RELATED APPLICATIONS

This application is a national phase entry under 35 U.S.C. § 371 of International Patent Application PCT/CN2015/081321, filed Jun. 12, 2015, designating the United States of America and published in English as International Patent Publication WO 2015/196933 A1 on Dec. 30, 2015, which claims the benefit under Article 8 of the Patent Cooperation Treaty to Chinese Patent Application Serial No. 201410290169.5, filed Jun. 25, 2014.

TECHNICAL FIELD

This application relates to a solid-filling coal mining feeding and conveying monitoring system that is particularly suitable for monitoring the state and operation situations of a solid-filling coal mining feeding and conveying system in a well mine employing solid-filling coal mining technology.

BACKGROUND

Currently, the solid-filling coal mining technology is expanded and applied on a large scale in the country, where the ground solid-filling materials are transported to underground, mainly by a feeding and conveying system that can safely, effectively and continuously convey the ground solid-filling materials to underground and guarantee the supply of the materials on the solid-filling coal mining working face, with a conveying capacity of over 500 t/h and a conveying height from tens to hundreds of meters. Because of closure and huge impact force in the material feeding process of the solid-filling material feeding and conveying system, manual real-time monitoring cannot be realized, along with easily occurring situations like poor ground and underground information communication, full or empty warehouse of the storage silo, feeding pipe blockage, etc. Therefore, a solid-filling coal mining feeding and conveying monitoring system is designed for real-time monitoring and controlling the state of the feeding and conveying system and the operation situations of the devices, which is important for the operation of the solid-filling coal mining feeding and conveying system and the supply of the filling materials on the solid-filling coal mining working face.

BRIEF SUMMARY

Technical problem: This disclosure is aimed to provide a solid-filling coal mining feeding and conveying monitoring system for real-time monitoring and controlling the solid-filling coal mining feeding and conveying state and operation situations of the devices.

Technical solution: the solid-filling coal mining feeding and conveying monitoring system of this disclosure comprises an industrial control computer, a PLC control box, an operating platform, a liquid crystal display, a color four-picture divider, two video optical receivers and loudspeaker boxes, a camera a, a camera b, a camera c, a camera d, an uphole electronic belt scale, a downhole electronic belt scale, a radar level meter, a coal level sensor, a vibration sensor and various matching junction boxes and cables; wherein the operating platform, the liquid crystal display, the color four-picture divider, the video optical receivers and the loudspeaker boxes are all installed in a control room; the camera a is installed at the outlet of a stock ground, the camera b is installed above an uphole feeding port, the camera c is installed at an upper port of a storage silo, the camera d is installed in a gangue transportation lane, the monitoring videos of all the cameras are transmitted to the ground control room via cables, signals acquired in real time are displayed on the liquid crystal display; the uphole electronic belt scale is installed on a ground rubber belt conveyor, the downhole electronic belt scale is installed on a downhole rubber belt conveyor; the radar level meter and the coal level sensor are installed in the storage silo, and the vibration sensor is installed under a damping beam of a buffering device.

Beneficial effects: various monitoring, analyzing and controlling devices are employed in this disclosure to realize functions of centralized control, state monitoring, record query and full silo alarm of the state of the solid-filling coal mining feeding and conveying system and the running situation of various devices; the uphole and downhole information of the feeding and conveying system can be real-time controlled; the starting and stopping of various devices can be controlled, etc.; and the blockage of the feeding and conveying pipe can be avoided, thereby guaranteeing safe, efficient and continuous operation of the solid-filling coal mining feeding and conveying system. The system of this disclosure is indispensable in a filling material transportation system. Therefore, the system is simple, easy to operate and has excellent benefit and wide practicability in the technical field.

BRIEF DESCRIPTION OF THE DRAWINGS

FIG. 1 is a devices layout diagram of a monitoring system of this disclosure.

In the FIGURE, the following reference numerals will identify the listed elements: 1—stock ground, 2—camera A, 3—camera B, 4—control room, 5—liquid crystal display, 6—operating platform, 7—industrial control computer, 8—feeding port, 9—ground rubber belt conveyor, 10—uphole electronic belt scale, 11—material aggregation port, 12—ground coal feeder, 13—feeding pipe, 14—camera C, 15—buffering device, 16—damping beam, 17—radar level meter, 18—vibration sensor, 19—coal level sensor, 20—storage silo, 21—camera D, 22—gangue transportation lane, 23—downhole coal feeder, 24—downhole electronic belt scale, 25—downhole rubber belt conveyor.

DETAILED DESCRIPTION

An example of this disclosure is further described below while referring to the FIGURE:

A solid-filling coal mining feeding and conveying monitoring system of this disclosure mainly consists of an industrial control computer 7, a PLC control box, an operating platform 6, a liquid crystal display 5, a color four-picture divider, two video optical receivers and loudspeaker boxes, a camera A 2, a camera B 3, a camera C 14, a camera D 21, an uphole electronic belt scale 10, a downhole electronic belt scale 24, a radar level meter 17, a coal level sensor 19, a vibration sensor 18 and various matching junction boxes and cables. The operating platform 6, the liquid crystal display 5, the color four-picture divider, the video optical receivers and the loudspeaker boxes are all installed in a control room 4. The camera A 2 is installed at the outlet of a stock ground 1. The camera B 3 is installed above an uphole feeding port 8. The camera C 14 is installed at the upper port of a storage silo 20. The camera D 21 is installed in a gangue transportation lane 22. The monitoring videos of all the cameras are transmitted to the ground control room 4 via cables. The stocking situation of the stock ground 1, the situation of the uphole feeding port 8, the level of the downhole storage silo 20, the running state of the buffering device 15, the operation situation of the downhole coal feeder 23, and the downhole rubber belt conveyor 25 are real-time displayed on the liquid crystal display 5. The uphole electronic belt scale 10 is installed on the ground rubber belt conveyor 9. The downhole electronic belt scale 24 is installed on the downhole rubber belt conveyor 25, respectively, for real-time monitoring and recording the excess amount of the filling materials. The radar level meter 17 and the coal level sensor 19 are installed in the storage silo 20 for real-time monitoring the material amount in the storage silo. The vibration sensor 18 is installed under a damping beam 16 of a buffering device 15 for real-time monitoring the running state of the buffering device 15.

Working principle and working process: four cameras A, B, C, and D are, respectively, installed in the stock ground 1 above the uphole feeding port 8 at the upper port of the downhole storage silo 20 and in the gangue transportation lane 22, respectively, for real-time monitoring the stocking situation of the stock ground 1, the feeding situation of the feeding port 8, the level of the storage silo 20 and the running state of the buffering device 15, the operation situations of the lower port of the storage silo 20, the downhole coal feeder 23 and the downhole rubber belt conveyor 25. The information is directly displayed on the liquid crystal display 5 in the control room 4 in a video form, such that the operator can check the real-time operation situation of various devices at any time.

The uphole electronic belt scale 10 is installed on a ground rubber belt conveyor 9, and the downhole electronic belt scale 24 is installed on a downhole rubber belt conveyor 25, respectively, for real-time monitoring and recording the excess amount of the filling materials.

The radar level meter 17 and the coal level sensor 19 are installed in the storage silo 20 for real-time monitoring the material amount in the storage silo 20. By analyzing the monitoring data of the radar level meter 17 and the coal level sensor 19, the storage amount in the storage silo 20 can be obtained. When the storage amount reaches the set maximum, a buzzer in the PLC control box gives an alarm.

The vibration sensor 18 is installed under the damping beam 16 of the buffering device 15 for real-time monitoring the running state of the buffering device 15. By analyzing the operating state of the vibration sensor 18, if the feeding port 8 is feeding while the vibration sensor 18 does not sense any vibration signal, the buzzer gives an alarm.

The industrial control computer 7, the operating platform 6, the liquid crystal display 5, the color four-picture divider, the two video optical receivers and loudspeaker boxes are all installed in the control room 4. The monitoring data from the camera and the sensor is transmitted to the control room 4 via cables. Starting, stopping and locking of the ground rubber belt conveyor 9, the uphole electronic belt scale 10, the downhole electronic belt scale 24 and the downhole rubber belt conveyor 25 can be realized in the control room. Meanwhile, history and operating record of the monitoring data can be queried in the control room. When the difference between the excess amount of the ground rubber belt conveyor 9 recorded by the uphole electronic belt scale 10 and the excess amount of the downhole rubber belt conveyor 25 recorded by the downhole electronic belt scale 24 exceeds the set value, the buzzer gives an alarm. When the ground control room 4 receives the alarm, the operation of the ground rubber belt conveyor 9 and the ground coal feeder 12 would be stopped immediately.

The invention claimed is:

1. A solid-filling coal mining feeding and conveying monitoring system, comprising: an industrial control computer, a PLC control box, an operating platform, a liquid crystal display, a color four-picture divider, two video optical receivers and loudspeaker boxes, a camera A, a camera B, a camera C, a camera D, an uphole electronic belt scale, a downhole electronic belt scale, a radar level meter, a coal level sensor, a vibration sensor and various matching junction boxes and cables, wherein:

the operating platform, the liquid crystal display, the color four-picture divider, the video optical receivers and the loudspeaker boxes are all installed in a control room;
the camera A is installed at an outlet of a stock ground;
the camera B is installed above an uphole feeding port;
the camera C is installed at an upper port of a storage silo;
the camera D is installed in a gangue transportation lane;
monitoring videos of all of the cameras are transmitted to the control room via cables;
signals acquired in real time are displayed on the liquid crystal display;
the uphole electronic belt scale is installed on a ground rubber belt conveyor;
the downhole electronic belt scale is installed on a downhole rubber belt conveyor;
the radar level meter and the coal level sensor are installed in the storage silo; and
the vibration sensor is installed under a damping beam of a buffering device.

2. A solid-filling coal mining feeding and conveying monitoring system comprising:
a computer;
a programmable logic controller ("PLC") control;
an operating platform installed in a control center;
a display installed in the control center;
a color four-picture divider installed in the control center;
video optical receivers and speakers installed in the control center;
a first video recording device installed at an outlet of a stock ground;
a second video recording device installed above an uphole feeding port;
a third video recording device installed at an upper port of a storage silo;
a fourth video recording device installed in a gangue transportation lane;
an uphole electronic belt scale installed on a ground rubber belt conveyor;
a downhole electronic belt scale installed on a downhole rubber belt conveyor;
a radar level meter installed in the storage silo;
a coal level sensor installed in the storage silo; and
a vibration sensor installed under a damping beam of a buffering device,
wherein the monitoring videos of all the video recording devices are transmitted to the control center, and
wherein signals acquired in real time are displayed on the display.

3. A solid-filling coal mining feeding and conveying monitoring system, suitable for monitoring of a vertical feeding and conveying system in underground mine solid-filling mining, the solid-filling coal mining feeding and conveying monitoring system comprising the following components:
an industrial control computer;

a programmable logic controller ("PLC") control;
an operating platform;
a liquid crystal display;
a color four-picture divider;
video optical receivers and loudspeakers;
four video cameras;
uphole electronic belt scales;
downhole electronic belt scales;
a radar level meter;
a coal level sensor; and
a vibration sensor,
wherein said components are configured variously in a material field, a control room, upper and lower openings of a storage silo, and a gangue transportation lane associated with the system, so as to allow the system to monitors the system's status, have a full silo alarm, have centralized control, and allow for recording and querying.

* * * * *